(12) United States Patent
Tokunaga et al.

(10) Patent No.: US 7,625,971 B2
(45) Date of Patent: Dec. 1, 2009

(54) SILICA-LOADED GRANULAR RUBBER AND PROCESS FOR PRODUCING THE SAME

(75) Inventors: Shinji Tokunaga, Syunan (JP); Tsunetoshi Sugimura, Syunan (JP); Kazutaka Watanabe, Syunan (JP); Osamu Yatabe, Syunan (JP); Takeshi Karato, Tokyo (JP); Takahiko Fukahori, Tokyo (JP); Yoshihiro Chino, Tokyo (JP)

(73) Assignees: Tokuyama Corporation, Syunan-shi (JP); Zeon Corporation, Tokyo (JP)

( * ) Notice: Subject to any disclaimer, the term of this patent is extended or adjusted under 35 U.S.C. 154(b) by 62 days.

(21) Appl. No.: 10/568,393
(22) PCT Filed: Aug. 19, 2004
(86) PCT No.: PCT/JP2004/012242

§ 371 (c)(1),
(2), (4) Date: Jul. 10, 2006

(87) PCT Pub. No.: WO2005/017002

PCT Pub. Date: Feb. 24, 2005

(65) Prior Publication Data

US 2006/0281850 A1 Dec. 14, 2006

(30) Foreign Application Priority Data

Aug. 19, 2003 (JP) .............................. 2003-207926

(51) Int. Cl.
*C08K 3/36* (2006.01)
*C08J 3/16* (2006.01)
*C08C 1/14* (2006.01)

(52) U.S. Cl. ........................ 524/492; 524/847; 524/571; 428/402; 523/223; 523/352; 523/333

(58) Field of Classification Search .................. 524/492, 524/847; 523/223, 352; 428/402
See application file for complete search history.

(56) References Cited

U.S. PATENT DOCUMENTS 4,551,240 A * 11/1985 Beppu et al. ................. 209/143
4,757,101 A * 7/1988 Kleinert et al. .............. 523/220
4,771,092 A * 9/1988 Ollenik et al. ................ 524/99
4,828,714 A * 5/1989 Smigerski .................... 210/710
6,433,064 B1 * 8/2002 Gorl et al. .................... 524/492
6,878,759 B2 * 4/2005 Goerl et al. .................. 523/212

FOREIGN PATENT DOCUMENTS

| JP | 2003-138025 | | 5/2003 |
| JP | 2003-138025 A | * | 5/2003 |
| JP | 2003-286369 | * | 10/2003 |
| JP | 2003-286369 A | * | 10/2003 |

OTHER PUBLICATIONS

JP 2003-286369 (Oct. 2003) abstract and translation in English.*
International Search Report dated Sep. 28, 2004 of PCT/JP2004/012242.

* cited by examiner

*Primary Examiner*—David Wu
*Assistant Examiner*—Rip A. Lee
(74) *Attorney, Agent, or Firm*—Westerman, Hattori, Daniels & Adrian, LLP (57) ABSTRACT

Disclosed are silica-filled rubber granules comprised of a cocoagulation product of rubber and silica, which are extremely less powdery and excellent in handling and kneading, as well as an industrially advantageous process for producing same. The silica-filled rubber granules of the present invention are dried granules of a cocoagulation product of rubber and silica particles, which are characterized in that an average particle diameter (D50) in terms of the sieve analysis is 300~3000 μm and the weight ratio of the granules within the range of D50±(D50×0.5) is at least 50% by weight. The silica-filled rubber granules are produced by supplying a cake of a cocoagulation product of silica and rubber having a water content of 40~80% by weight to a drier provided with an indirect-heating type container having stirring wing blades, and then drying the cake while stirring it with the stirring wing blade.

3 Claims, 1 Drawing Sheet

FIG 1

SILICA-LOADED GRANULAR RUBBER AND PROCESS FOR PRODUCING THE SAME

TECHNICAL FIELD

The present invention relates to novel silica-filled rubber granules and a novel process for producing same, and more particularly to silica-filled rubber granules comprising dry granules of a cocoagulated substance of a rubber and silica particles, which is extremely less powdery and good in handling and in kneading property as well as an industrially beneficial process for producing same.

BACKGROUND ART

From the past, carbon black and silica are widely used as reinforcing fillers for rubber (referred to hereinafter simply as reinforcing material). In general rubber is incorporated with such fillers widely by way of a dry process wherein a kneading apparatus such as a Banbury mixer, an open roll, or a kneader is employed.

According to the dry process, however, much more kneading energy and time are required to obtain a rubbery composition incorporated with fillers. Mentioned as the reason therefor is that a rubber such as a styrene-butadiene copolymer rubber or butadiene rubber is in the form of a bale so that tremendous shearing power is needed at the initial stage of kneading and a large amount of fillers is to be dispersed into such rubber that is difficult in kneading.

With a view to reducing kneading energy and time in the dry process, a process for obtaining a rubbery composition incorporated with fillers has been investigated wherein a rubber latex and fillers are mixed in an appropriate proportion, and then rubber in the rubber latex is coagulated with a coagulating agent such as an acid or a salt thereby incorporating the coagulated rubber uniformly with the fillers, or in other words, cocoagulation.

With respect to a process for obtaining a cocoagulation product of rubber containing silica as filler, there are proposed a method of treating silica with an alkyltrimethylammonium salt (patent literature 1), a method of dispersing silica together with a silylating agent into a rubber latex (patent literature 2), a method of treating silica with an organosilicon compound (patent literature 3) and a method of treating silica with a cationic polymer (patent literature 4).

In these patent literatures, however, there is no disclosure on a concrete manner from solid-liquid separation to drying of the resultant cocoagulation product and on the form of the resultant silica-filed rubber.

In case a method using a hot blast drier followed by a bale shaping, which is adopted as a general technique for conventional cocoagulation products of carbon black, is used for obtaining a dried product of the cocoagulation product of silica and rubber, the silica particles in the rubber are strong in their mutual action so that the dried product are obtained as an extremely hard block. A problem arises in such block since crushing followed by kneading of the block at the time of shaping is difficult. Looking at the production method, silica is of hydrophilic property and gives a high aqueous content in the resultant coagulation product so that a longer period of time is needed for drying, thus offering a problem in industrial operation.

These problems are caused by the fact that silica is extremely higher in hydrophilic property than carbon black.

On the other hand, there are disclosed a process for obtaining a powdery silica-filled rubber according to a method wherein an aqueous cocoagulation product obtained by cocoagulation of silica and rubber is subjected as such or after concentration to spray-drying, or alternatively, the aqueous cocoagulation product is well dried by the aid of a filter press or centrifugal separator and subjected to fluidized drying in a fluidized bed (patent literature 5) and according to a method wherein the cocoagulation product after solid-liquid separation is shaped into the silica-filled rubber in the form of pellets (patent literature 6).

However, the powder obtained according to the spray-drying has a relatively small average particle diameter of about 100 μm and easily becomes dusty. Further, the powder attaches to apparatus due to static electricity so that a problem arises in any weighing error.

The powders obtained by drying due to the fluidized bed are more or less adjustable in average particle diameter according to the degree of pulverization, but the particle size distribution of the resultant powders, including those attached each other in the fluidized bed and those more finely pulverized, becomes broader. Likewise the powder obtained by spray-draying, therefore, a problem also arises in the generation of dust caused by very fine power and in any weighing error caused by attaching of the power to apparatus due to static electricity.

The aforesaid pellets becomes appreciably hard after drying and their granular size is large, usually 5~10 mm so that the effect of reducing shearing power at the initial stage of kneading is small. In case mutually attaching power of the pellets is strong, the pellets tend to initiate blocking during storage. Looking at the process for production, therefore, a problem arises in necessity of a separate step of making the pellets.

Patent literature 1: U.S. Pat. No. 4,482,657
Patent literature 2: JP-A-11-286577
Patent literature 3: JP-A-10-231381
Patent literature 4: JP-A-2003-113250
Patent literature 5: JP-A-2000-351847
Patent literature 6: JP-A-2003-160668

DISCLOSURE OF THE INVENTION

Accordingly, it is an object of the present invention to provide silica-filled rubber granules wherein a cocoagulation product of rubber and silica is in the form of dried granules of extremely less powdery nature which are good in handling and kneading and to provide an industrially advantageous process for producing the silica-filled rubber granules.

The present inventors have made an extensive study with a view to solving the aforesaid technical problems and, as a result thereof, it has now been found that a cake of a cocoagulation product having a specific moisture content which is obtained by mixing rubber latex with silica followed by cocoagulating the mixture is dried by the aid of a specific drier while applying shearing power to the cake, thereby to obtain a granular product almost devoid of finely divided particles which has never been realized as a conventional cocoagulation product in the form of dried solid and that the granular product is therefore less powdery nature, less blocking during storage but good in fluidizing property and thus excellent in handling so that the product is suitably subjected to a kneading work by the aid of a conventional kneading apparatus employed in kneading of rubber. The present invention has been accomplished on the basis of the above finding.

In accordance with the present invention, there is provided silica-filled rubber granules comprising dried granules of a cocoagulation product of rubber and silica particles having an average article diameter (D50) in terms of the sieving analysis of 300~3000 μm and having a weight ratio of the granules within the range of D50±(D50×0.5 of greater than 50% by weight.

In accordance with the present invention, there is also provided an industrially very advantageous process for producing silica-filled rubber granules including the above process for producing the silica-filled rubber granules In accordance with the present invention, there is further provided a process for producing silica-filled rubber granules which comprises feeding a cake of a cocoagulation product of silica and rubber having a moisture content of 40~80% by weight to a drier provided with an indirect-heating vessel fitted with stirring blades, stirring the cake with the stirring blades under shearing power, and drying the cake.

In the aforesaid process of the present invention, silica-filled rubber granules of an extremely uniform grain size and in the form of approximate spheres can be obtained by carrying out the drying treatment while filtering a liquid containing the cocoagulation product and adjusting the moisture content of the cake to 55~80% by weight. Such silica-filled rubber granules are excellent in design and particularly excellent in handling as in fluidity, etc and kneading property at the time of molding.

By the term "approximate spheres" is meant herein a shape of spheres having a sphericity of at least 0.6 wherein the true spherical degree is determined by a ratio of the major axis ($D_L$) and the minor axis ($D_S$) of the granules, i.e.( $D_S/D_L$).

Figure 1:
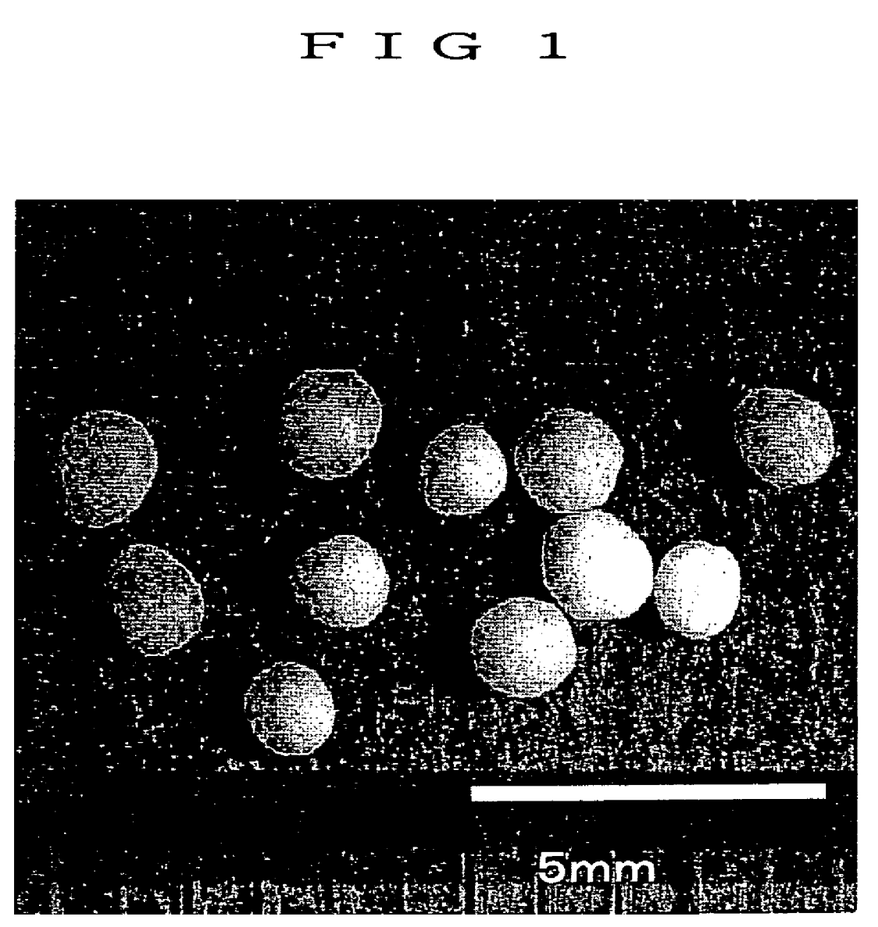
FIG. 1 is an optical microscopic photograph showing the granular structure of a silica-filled rubber granules obtained according to the process shown in Example 3.

THE BEST MODE FOR CARRYING OUT THE INVENTION (Rubber)

In the rubber used in the present invention, no limitation exists so far as it can obtain a cocoagulation product with silica. Illustrative of the rubber are, in general, diene rubbers such as butadiene rubber, isoprene rubber, butadiene-isoprene copolymeric rubber, styrene-butadiene copolymeric rubber, styrene-butadiene-isoprene copolymeric rubber, acrylonitrile-butadiene copolymeric rubber, and acrylonitrile-styrene-butadiene copolymeric rubber; and synthetic rubber such as chloroprene rubber, butyl rubber and acrylic rubber; and natural rubber. Besides, denatured rubber wherein functional groups such as hydroxyl groups, carboxyl groups, alkoxysilyl groups, amino groups, and epoxy groups have been introduced into these synthetic rubbers can be used. These rubbers can be used singly or in combination of more than one.

An oil-extended rubber wherein the rubber is mixed with an extending oil is also used as the aforesaid rubber. Extender oils usually used in rubber industry are used as such extending oils. Examples of the extender oil include petroleum type softening agents of paraffin series, aromatic series and naphthene series, softening agents of plant series, and fatty acids. The softening agents of petroleum series are preferably those containing less than 3% multi-ring aromatic compounds. This content is measured according to the IP346 method (the testing method of THE INSTITUTE PETROLEUM, U.K.)

The rubber used in the present invention preferably has a Mooney viscosity (ML1+4, 100° C.) within the range of 100~200, desirably 30~150.

In case the silica-filled rubber granules are used for tire, the use of a diene-type rubber such as styrene-butadiene copolymeric rubber and butadiene rubber is preferable.

(Silica)

No special limitation exists in the present invention with respect to the silica to be added as filler to the rubber. Mentioned, for example, are precipitated silica prepared by neutralization reaction (the so-called wet process) of an alkali silicate with a mineral acid, dry silica obtained by burning silicon tetrachloride in oxygen-hydrogen flame, and a sol-gel silica obtained by hydrolysis of a silicon alkoxide such as tetramethoxysilane or tetraethoxysilane in an aqueous organic solvent. In case of the precipitated silica, a part of a mineral acid or aluminum sulfate in lieu of the mineral acid is used for the neutralization reaction and the resultant precipitated silica containing a large amount of the metal salt can also be used. These silica materials can be used alone or in combination of at least two.

Among these silica materials, the precipitated silica excellent in reinforcing property for rubber and in productivity is preferable in the present invention.

As a more detailed description for the aforesaid precipitated silica, the specific surface area ($S_{BET}$) in terms of the nitrogen adsorption method of the precipitated silica is preferably 70~300 m$^2$/g, more preferably 80~280 m$^2$/g, and more preferably 90~260 m$^2$/g.

Further, the specific surface area ($S_{CTAB}$) of the silica measured by adsorption of cetyltrimethylammonium bromide (CTAB) is preferably 60~300 m$^2$/g, more preferably 70~280 m$^2$/g, and most preferably 80~260 m$^2$/g.

Furthermore, the oil absorption amount of the silica with butyl phthalate (referred to hereinafter simply as "oil absorption amount") is 100~400 ml/100 g, more preferably 110~350 ml/100 g, and most preferably 120~300 ml/100 g.

In case a silica having a specific surface area and oil absorption amount within the above-mentioned ranges is used, the reinforcing properties such as tensile strength and anti-abrasive property of the resultant silica-filled rubber granules and cross-linked rubber obtained therefrom by cross-linking are especially remarkable. Two or more of the silica having different specific surface area and oil absorption amount within the above-mentioned range may be used in combination.

(Cocoagulation Product)

In the present invention, a rubber latex and silica particles in the above-mentioned proportion are mixed and dispersed thereby coagulating rubber in the rubber latex and simultaneously incorporating the silica into the rubber. The degree of coagulation is such that both components cannot be separated merely by washing with water. Thus, it is presumed that the rubber is incorporated with the silica.

Taking hardness of the resultant silica-filled rubber granules and physical properties of the cross-linked rubber into consideration, the proportion of the silica to the rubber in the aforesaid cocoagulation product is generally 20~300 parts by weight, preferably 30~250 parts by weight, more preferably 40~200 parts by weight per 100 parts by weight of the rubber.

(Character of the Silica-Filled Rubber Granules)

A character of the silica-filled rubber granules of the present invention resides in distribution of the granule size. Namely, the silica-filled rubber granules of the present invention is characterized in that the granules are comprised of the aforesaid cocoagulation product and its average particle diameter (D50) in terms of the sieving analysis is 300~3000 μm, preferably 500~2000 μm and the weight ratio of the granules within the range of 50±(50×0.5) is at least 50% by weight, preferably 80% by weight.

The aforesaid average particle diameter (D50) stands for a value in case of the accumulated weight percentage remained on the sieve being 50%.

The silica-filled rubber granules comprised of a cocoagulation product of the rubber and the silica particles having such distribution of granule size have been proposed for the first time by the present invention. In comparison with the conventional cocoagulation product in the form of pellets, powders or bales, the silica-filled rubber granules of the present invention are of the following advantages:

(1) Advantage Over the Cocoagulation Product in the Form of Pellets:

The silica-filled rubber granules of the present invention are excellent in fluidity so that conveyance becomes easy and energy needed for the initial stage of kneading can be minimized.

(2) Advantage Over the Cocoagulation Product in the Form of Powders:

The use of the silica-filled rubber granules of the present invention inhibits the generation of dust on kneading and minimizes attachment of the dust to the apparatus due to static electricity so that accuracy at the time of automatic measurement is warranted.

(3) Advantage Over the Cocoagulation Product in the Form of Bales:

The use of the silica-filled rubber granules of the present invention minimizes kneading time and kneading energy so that productivity can be promoted.

In case an average particle diameter of the cocoagulation product is less than 300 mμ, the generation of dust easily tend to take place so that a problem arises in handling, especially in generation of dust during working. On the other hand, if an average particle diameter of the cocoagulation product exceeds 3000 μm, there would be anxiety about lowering of fluidity and any reduction in minimizing effect of kneading energy at the initial stage.

In case the weight ratio of the dried granules within the range of the aforesaid D50±(50×0.5) is less than 50% by weight, fine powders and coarse granules are increased so that problems of the generation of dust, any adhesion of powders to the apparatus, etc. will take place.

A preferable embodiment of the silica-filled rubber granules of the present invention are those containing not more than 30% by weight of fine powders of 200 μm or less, preferably not more than 20% by weight of the fine powders.

(Process for Producing the Silica-Filled Rubber Granules)

No special limitation exists in the process for producing the silica-filled rubber granules of the present invention, Mentioned as an industrially advantageous method is a process wherein a cake having a moisture content of 40~80% by weight obtained by filtering a liquid containing the cocoagulation product of silica and rubber is fed to a drier equipped with a vessel fitted with stirring wing blades and an indirect heater thereby drying the cake while stirring it by the stirring wing blades.

As the liquid containing the cocoagulation product of silica and rubber used in the present invention, a liquid obtained by mixing silica with a rubber latex and subjecting the mixture to cocoagulation can be used without any limitation. So far as a method for obtaining a cocoagulation product wherein silica is incorporated uniformly into the rubber is concerned, no limitation exists in methods for obtaining cocoagulation product of silica and rubber, and any of the known techniques can be applied. For example, the process disclosed in the aforesaid U.S. Pat. No. 4,482,657, JP-A-11-286577, JP-A-10-231381, or JP-A-2003-113250 can be used therefor. More precisely, a process wherein silica is treated with an alkyltrimethylammonium salt, a silylating agent, an organosilicon compound or a cationic high molecule to enhance affinity to rubber, and an aqueous suspension of the silica is mixed with the rubber to effect cocoagulation of the silica and the rubber is mentioned.

In general, the liquid containing the cocoagulation product of silica and rubber obtained according to the above process has a solid concentration of 2~20% by weight and the particle diameter of the cocoagulation product in the liquid is preferably 50~5000 μm, preferably 80~2000 μm. A detailed explanation is given hereinafter on the liquid containing the cocoagulation product of the silica and the rubber.

(Rubber Latex)

As the rubber latex used in the present invention, the aforesaid rubber latex can be used without any limitation. A rubber latex stabilized with an anionic emulsifier, a non-ionic emulsifier or a cationic emulsifier may be used as the rubber latex.

The concentration of rubber in the rubber latex is not especially defined and may be defined conveniently according to the purpose and the use of the rubber. Usually, the concentration is preferably with the range of 5~80% by weight.

If necessary, the rubber latex may be incorporated with an antioxidant. Illustrative of the antioxidant are, for example, antioxidants of phenol type such as 2,6-di-tert-butyl-4-methylphenol, octadecyl-3-(3',3'-di-tert-butyl-4-hydroxylphenol) propionate, styrenated phenol, etc; antioxidants of sulfur type such as 2,4-bis(octylthiomethyl)-6-methylphenol, antioxidants of an amine type such as N-(1,3-dimethylbutyl)-N'-phenyl-p-phenylenediamine; antioxidants of quinoline type such as 2,2,4-trimethyl-1,2-dihydroquinoline; antioxidants of hydroquinone type and antioxidants of phosphorus type.

(Aqueous Suspension of Silica)

In the production process of the present invention, the aforesaid silica is used without any special limitation as silica constituting the aqueous silica suspension. The concentration of the silica in the aqueous suspension of silica is adequately 3~30% by weight, preferably 5~20% by weight.

(Cocoagulation)

In the process of the present invention, any of the known methods is employed without special limitation a method for mixing the rubber latex with the aqueous suspension of silica. The use of process disclosed in the above-mentioned JP-A-2003-113250 is preferable since the silica is incorporated into the rubber at a high probability.

It is recommended to make cocoagulation of the silica with rubber in the rubber latex concurrently with or after mixing the rubber latex with the aqueous suspension of silica containing a cationic high molecule or the like method.

Especially in case the rubber latex stabilized with an anionic emulsifier is used, a part or all of the rubber is coagulated together with silica according to a reaction of the cationic high molecule with the anionic emulsifier thereby incorporating the silica into the rubber.

In general, cocoagulation of silica and a rubber latex stabilized with the anionic emulsifier is finished by the action of the cationic high molecule. For completion of the coagulation of rubber, however, an inorganic acid such as sulfuric acid, phosphoric acid, hydrochloric acid, or the like; a Lewis acid such as aluminum sulfate, or the like; or a salt such as sodium chloride or potassium chloride can be used at need.

(Adjustment of the Moisture Content of the Cake)

In the process for producing the silica-filled rubber granules of the present invention, the liquid containing the cocoagulation product of the silica and the rubber obtained according to the aforesaid process is filtered and, if necessary, dehydrated so that the moisture content of the cake becomes 40~80% by weight, preferably 45~75% by weight, and especially 55~75% by weight. If the moisture content of the cake is less than 40% by weight, the cake becomes too hard to crush it into pieces so that granules having a great granule size and a wide distribution of grain size tend to be formed easily. If the moisture content of the cake exceeds 80% by weight, attachment of the cake to the inside of drier is increased to reduce the drying efficiency.

No limitation exists in the method for filtration followed by drying, and any of the known apparatus can be used therefor. Applicable to the method are, for example, a screen, a centrifuge, a decanter, a filter press, etc. Among these, the filter press is preferable since it is applicable in case the concentration and particle diameter of the cocoagulation product contained in the liquid are changed and in case the moisture content of the cake is controlled adequately by varying the compressed pressure (dehydration).

Conditions in case of using the filter press for the above-mentioned dehydration are not limited, but the liquid containing the cocoagulation product is usually fed to a filtering chamber of the filter press under filtering pressure of 100~400 KPaG by a pump. No particular limitation exists in the pump for applying the liquid and any of the known pumps can be used. For example, any of the centrifugal pumps, diaphragm pumps, mohno pumps or the like can be used but the mohno pump is especially preferable.

Next, the cake accumulated in the filtering chamber is compressed so as to obtain the cake having a moisture content of 30~80% by weight. A pressure during the compressing operation is preferably 0~2000 KPaG, more preferably 300~1800 KPaQ and especially preferably 600~1400 KPaG. If the moisture content of the cake is within the above-mentioned range, however, the compressing operation would be unnecessary. Compressed air can be used up to a pressure of 700 KPaG. However, water pressure should be utilized if the compressed pressure exceeds 700 KPaG.

(Dividing of the Cake)

In the present invention, dividing of the cake prior to feeding it to a drier is preferable for obtaining the granules having a sharp size distribution. In particular, diving is effective in case of drying the cake having a moisture content of not more than 75%. Dividing of the cake is not especially limited and a known conventional device can be employed. For example, any of the apparatus such as a stirring type crusher, a crusher type dividing machine, a ball-mill type dividing machine or the like can be used and plural dividing machines may be used in combination as the case may be. No limitation exists in the method of dividing (batchwise or continuous), the shape of the stirrer, the shape of the shaft, the number of the shafts, the length of the shaft, the shape of the crusher portion, and the material of the balls, so far as dividing is possible.

Among the above-mentioned dividing machines, an apparatus provided in combination with a stirring type dividing machine capable of dividing the cake having a wide range of moisture contents of 40~80% and a two-shafts screw type dividing machine is especially preferable.

For example, the cake discharged from a filter press is fed to a hopper equipped with a stirring type dividing machine to effect a primary dividing. In case a two-shafts screw type dividing machine is fitted to the lower part of the hopper, a secondary dividing is effected in situ and the divided cake is thrown into a drier. In case of dividing the cake having a moisture content of 40~55%, the granule diameter at the final stage of dividing is preferably 5 mm or less, more preferably 3 mm or less and most preferably 1 mm or less so that the granules after dividing may be made more uniform in granule diameter. If the granule diameter at the final stage exceeds 5 mm, the granules tend to become non-uniform in granule diameter. The two-shafts screw type dividing machines enable to make self-cleaning of the screw grooves so that it is effective for the cake within the range of moisture content exhibiting attaching property.

(Drying)

In the present invention, no limitation exists in the drier for drying the cake or a divided material thereof and any of the known conventional driers can be used so far as the drier is capable of applying shearing force to the cake and is comprised of an indirect-heating container having stirring wing blades. The mode of drying may be either batchwise or continuous. The shape of either vertical type or horizontal type can obtain the granules, but in a drying process considering productivity, the continuous mode and the horizontal shape are preferable. In case of the production amount is small, one drier is sufficient enough for drying the case. In case of the amount is large, a serial arrangement of at least two driers is generally better in production efficiency.

In this case, the drying operation for forming the granules is preferably carried out in the indirect-heating container having stirring wing blades. No limitation exists in the drier to be established after the above drying operation. More concretely, after-drying operation is most preferably carried out by arranging at least two indirect-heating containers having stirring wing blades of the same type or a different type in shearing force (preferably smaller). As another embodiment, the indirect heating container having a strength to a certain degree have been obtained by the front stage drying with the indirect-heating container having stirring wing blades capable of applying shearing force, the drying operation is carried out while inhibiting generation of fine dust, In general, the drying time in the indirect-heating container having stirring wing blades capable of affording shearing force which is advantageous for the formation of the granules is 2~3 minutes, especially 3~20 minutes in terms of residential time, although the value is somewhat changeable according to the moisture content.

An explanation on the concrete embodiment of the indirect-heating container having stirring wing blades is as follows: In general, a heating medium is supplied to a jacket provided with the outside of the container, but besides the jacket, the heating medium is preferably supplied to the stirring shaft and stirring wing blades so that the heat-conductive area becomes larger. Used as the heating medium are an oil, steam, and warmed water. Feeding of the cake is carried out in any of the modes such as a batchwise mode, an intermittent mode, and a continuous mode. So far as the known conventional feeder is used, there is no particular limitation. As described above, however, the use of the two-shafts screw-type dividing machine can omit the use of any feeder.

Concerning the stirring, no limitation exists and a known conventional stirring wing blade can be used so far as its shape is a wing blade capable of applying shearing force to the fed cake or a divided product thereof and capable of stirring it for drying. For example, any of the wing blades such as inclined rod wing blades, inclined plate wing blades, helical ribbon wing blades, anchor wing blades, disk wing blades, and scraping wing blades can be used. No special limitation exists in the number of stirring shafts, but the number is preferably one to three with a view to simplifying the structure of the apparatus. The circumferential velocity of the stirring wing blades is preferably faster within the possible range of the apparatus for refreshing the cake on the heat-conductive surface in the container to promote heat-conductive efficiency. More concretely, the velocity is 0.3~10 m/s, preferably 2~10 m/s, and most preferably 4~10 m/s.

In the drier comprised of the indirect-heating container, the clearance (t) between the stirring wing blades and the wall of the container is adjusted to 2~50 mm, preferably 5~35 mm so that a more proper shearing force can preferably be applied to the cake of the cocoagulation product in the drier at the circumferential velocity of the stirring wing blades thereby obtaining granules having more uniform distribution of granule size.

In the aforesaid drier, the portion where the clearance (t) between the wall of the container and the stirring wing blades is within the above-mentioned range is preferably in the portion where the granular shape is formed. All of the portions in the drier is not necessary to adjust the clearance so as to have the value within the above range. More concretely, the above clearance is provided in the portion around the feeding hopper of the drier where the granular shape is formed.

The temperature of the cake or a divided product thereof in the course of drying is preferably not higher than 130° C. by adjusting the jacket temperature or the feeding amount of the cake or a divided product thereof in order to inhibit degradation of rubber. In accordance with the structure of the drier, it is also possible to control the temperature of the composition more stably by dividing the jacket into plural portions and controlling them with a heating medium having the same temperature or a different temperature.

In the present invention, a gas is preferably passed through the drier lest the water vapor evaporated in the drier should be condensed again, in order to dry the cake or a divided product thereof efficiently. Mentioned as the gas to be passed through the drier is air, nitrogen or other inert gas. No limitation exists in the temperature of the passing gas so far as the temperature does not permit the generation of dew. No limitation also exists in the flowing direction of the gas. In case of the continuous drying method, however, it is preferable to flow the gas from the exit of the composition to the entrance.

No special limitation exists in the internal pressure of the indirect-heating container during the drying and normal pressure or reduced pressure can be applied. However, drying under reduced pressure is preferable since the composition can be controlled at a lower temperature. Even in case the drying operation is carried out under reduced pressure, passing of the above mentioned gas through the container is effective.

Completion of the drying of the silica-filled rubber granules of the present invention is preferably at the stage where the moisture content of the composition becomes 5% by weight or less, especially 3% by weight or less. A composition having a moisture content exceeding 5% by weight not only fails to exhibit good physical properties but also brings about bad influence on use.

Fluidizing of the composition by stirring or discharging of the composition taking advantage of removal is preferable as a method for discharging the dried composition from the drier. In case of the continuous drying, however, the flowing gas must be sealed. Thus, it is general to use a method wherein the discharge portion of the composition is provided with a rotary valve or the like to seal the flowing gas.

Since the evaporated water vapor and the flowing gas from the drier may be entrained with the granules having a small particle diameter, a dust-collecting device is preferably fitted to the discharge portion of the drier. No special limitation exists in the dust-collecting device so that any known conventional device can be used. The evaporated water vapor and the flowing gas are allowed to pass through a low temperature condenser to recover the evaporated water alone. If impurities such as styrene and the like are contained in the recovered water, an appropriate treatment is carried out for discharged water. In this case, the drying process of the present invention minimized the amount of discharge gas as compared with the spray drying and the fluidized bed drying so that the labor for treating such discharge gas can remarkably be reduced.

(Other Additives)

The silica-filled rubber granules obtained according to the process of the present invention is incorporated with known conventional additives usually incorporated into rubber thereby to produce a rubber composition which is cross-linked, if necessary, for practical use.

Illustrative of such additive are, for example, additional other rubber; additional other silica; a filler such as carbon black, carbon-silica dual phase filler which is carbon black carried on the surface thereof with silica, talc, clay, calcium carbonate, aluminum hydroxide, and starch; an oil-extending oil; a silane-coupling agent; a cross-linking agent; a cross-linking accelerator; a cross-linking activating agent; an antioxidants; an activating agent; a process oil; a plasticizer; a lubricant; and a scorching-preventing agent. Further, the silica-filled rubber granules can be incorporated with the above as diluting rubber.

Illustrative of the other additional rubber are, for example, a polyether rubber such as epichlorohydrin rubber, a fluorine rubber, a silicone rubber, an ethylene-propylene-diene rubber, and an urethane rubber. These are selectively used according to the required characteristics. These other additional rubbers can be used singly or in combination of at least two.

Illustrative of the silane-coupling agent are, for example, vinyltriethoxysilane, β-(3,4-epoxycyclohexyl)ethyltrimethoxysilane, N-(β-aminoethyl)-γminopropyltrimethoxysilane, 3-octathio-1-propyltriethoxysilane, a sulfide such as bis[3-(triethoxysilyl)propyl]tetrasulfide, bis[3-(triethoxysilyl)propyl]disulfide; γ-trimethoxysilylpropyldimethylthiocarbamyl tetrasulfide as disclosed in JP-A-6-248116, and γ-trimethoxysilylpropylbenzothiazyl tetrasulfide. Since the scorching at the time of kneading is avoided, these silane-coupling agents preferably contain not more than 4 sulfur atoms per molecule. These silane-coupling agents can be used singly or in combination with at least two.

The proportion of the silane-coupling agent is preferably 0.1~20 parts by weight, more preferably 0.5~15 parts by weight, and most preferably 1~10 parts by weight per 100 parts of silica.

Illustrative of the carbon black are furnace black, acetylene black, thermal black, channel black and graphite. Among these, the furnace black is preferable. More concretely, mentioned are SAF, ISAF, ISAF-HS, ISAF-LS, IISAF-HS, HAF, HAF-HS, HAF-LS, and FEF.

The above-mentioned carbon black can be used singly or in combination of at least two. The proportion of the carbon black is usually not more than 150 parts by weight and a total of the carbon black and the silica is preferably 20~200 parts by weight per 100 parts by weight of the rubber.

The BET specific surface area of the carbon black is not specifically limited but is preferably 30~200 $m^2/g$, more preferably 50~150 $m^2/g$, and most preferably 70~140 $m^2/g$.

The oil-absorption amount of the carbon black is preferably 30~300 ml/100 g, more preferably 50~200 ml/100 g, and most preferably 80~160 ml/100 g.

Illustrative of the cross-linking agent are sulfur such as powdery sulfur, precipitated sulfur, colloidal sulfur, insoluble sulfur, or highly dispersed sulfur; a halogenated sulfur such as sulfur monochloride or sulfur dichloride; an organic peroxide such as dicumyl peroxide or di-tert-butyl peroxide; a quinone dioxime such as p-quinone dioxime or p,p-dibenzoylquinone dioxime; an organic polyamine compound such as triethylene tetramine, hexamethylenediamine carbamate, or 4,4'-methylene-bis-o-chloroaniline; and an alkylphenol resin having methylol groups. Among these, sulfur is preferable and powdery sulfur is especially preferable. These cross-linking agents are used singly or in combination of at least two.

The proportion of the cross-linking agent is preferably 0.1~15 parts by weight, more preferably 0.3~10 parts by weight, and especially preferably 0.5~5 parts by weight per 100 parts by weight of the rubber component. In case the cross-linking agent is within the aforesaid range, the rubber granules are excellent in fuel-saving property and reinforcing property.

Illustrative of the cross-linking accelerator are a sulfenamide type cross-linking accelerator such as N-cyclohexyl-2-benzothiazylsulfenamide, N-tert-butyl-2-benzothaizolsulfenamide, N-oxyethylene-2-benzothiazolsulfenamide, or N,N-diisoropyl-2-benzothiazolsulfenamide; a guanidine type cross-linking accelerator such as diphenylguanidine, di-o-tolylbiguanidine, or o-tolylguanidine; a thiourea type cross-linking accelerator such as diethylthiourea; a thiazole type cross-linking accelerator such as 2-mercaptobenzothiazole, dibenzothiazyl sulfide, or 2-mercaptobenzothiazole zinc salt; a thiuram type cross-linking accelerator such as tetramethylthiuram monosulfide or tetramethylthiouram disulfide; a diethyldithio carbamate type cross-linking accelerator such as sodium dimethyldithiocarbamate or zinc diethyldithiocabamate; and a xanthate type cross-linking accelerator such as zinc isopropylxanthate or zinc butylxanthate.

These cross-linking accelerators are used singly or in combination of at least two and those containing the sulfenamide type cross-linking accelerator are especially preferable.

The proportion of the cross-linking accelerator is preferably 0.1~15 parts by weight, more preferably 0.3~10 parts by weight and especially preferably 0.5~5 parts by weight per 100 parts by weight of the rubber component.

No special limitation exists in the cross-linking activating agent, but a higher fatty acid such as stearic acid or a zinc oxide can be used. Preferable is the use of zinc oxide having high surface activity and a particle diameter of not more than 5 m$\mu$. Mentioned is an active zinc white having a particle diameter of 0.05~0.2 m$\mu$ or a zinc white having a particle diameter of 0.3~1 m$\mu$. A zinc oxide having been treated on the surface thereof with a dispersing agent of an amine type can be used.

These cross-linking accelerators can be used singly or in combination of at least two.

The proportion of the cross-linking activating agent is appropriately chosen according to the sort of the cross-linking activating agent. The proportion of the higher fatty acid is preferably 0.05~15 parts by weight, more preferably 0.1~10 parts by weight, and especially preferably 0.5~5 parts by weight per 100 parts by weight of the rubber component. The proportion of the zinc oxide is preferably 0.05~10 parts by weight, more preferably 0.1~5 parts by weight, and especially preferably 0.5~3 parts by weight per 100 parts by weight of the rubber component.

Illustrative of the other additives are an activating agent such as diethylene glycol, polyethylene glycol, and a silicone oil; and a wax.

(Cross-Linked Rubber)

Cross-linked rubber obtained by cross-linking the silica-filled rubber granules of the present invention can be obtained by kneading the silica-filled rubber granules of the present invention in accordance with a usual method with the respective components followed by cross-linking. For example, the silica-filled rubber granules and other rubbers are kneaded with the additives and fillers except the cross-linking agent and the cross-linking accelerator, and thereafter mixing the kneaded mixture with the cross-linking agent and the crosslinking accelerator to form a cross-linkable composition. A kneading time of the silica-filled rubber granules and other rubbers together with the additives and filler except the cross-linking agent and the cross-linking accelerator is preferably from 30 seconds to 30 minutes while a kneading temperature is within the range of preferably 80~200° C., more preferably 100~190° C., and especially preferably 140~180° C. Next, the resultant kneading mixture is cooled down to preferably 100° C. or less, more preferably 80° C. or less, and thereafter kneaded with the cross-linking agent and the cross-linking accelerator.

In the present invention, no special limitation exists in the method of kneading, and suitably chosen according to the nature of the cross-linked rubber and magnitude thereof, etc. The cross-linkable rubber composition is preferably charged into a metal mold and heated to effect molding and cross-linking concurrently or alternatively a previously shaped cross-linkable composition is heated to effect cross-linking. The cross-linking temperature is preferably 120~200° C., more preferably 140~180° C. while the cross-linking time is usually about 1~120 minutes.

EFFECT OF THE INVENTION

The silica-filled rubber granules of the present invention is suppressed in the amount of existing fine powders so that the granules are extremely less powdery and excellent in handling and in kneading. The resultant cross-linked rubber composition which has been obtained by cross-linking the silica-filled rubber granules, wherein the silica and the rubber are homogeneously mixed is excellent in reinforcing properties such as tensile strength and anti-abrasive property.

Accordingly, the silica-filled rubber granules of the present invention can be utilized for the use taking advantage of the characteristic properties of the granules, for example, tire parts such as tread, under-tread, carcass, side-wall, and bead; rubbery articles such as hose, window frames, belt, shoe tread, vibration-preventing rubber, auto parts, and vibration-suppressing rubber; and resin-reinforced rubbery parts such as impact-resisting polystyrene and ABS resin. Among these, the rubber granules of the present invention are suitable for use in tire parts and especially suitable as tire tread for fuel-saving tires.

EXAMPLES

The present invention will now be illustrated more in detail by way of Examples and Comparative Examples, but it is to be construed that the present invention is not limited by these Examples. By the way, various physical properties given in these Examples and Comparative Examples were measured according to the following methods:

(1) An average particle diameter of silica in an aqueous suspension and an average particle diameter of a cocoagulation product of silica and rubber:

Using a light-scattering diffraction type particle size distribution measuring apparatus (Model LS-230 manufactured by Beckman Coulter Inc.), a volume median particle size was measured and the value was adopted as an average particle diameter.

(2) Specific surface area:

Measurement of the specific surface area ($S_{BET}$) according to the nitrogen absorption method:

A silica wet cake was placed in a drier (120° C.) for drying, and thereafter using Model ASAP 2010 manufactured by Micrometritix, the nitrogen adsorption amount was measured and the value according to the single point analysis at relative pressure 0.2.

Measurement of the specific surface area ($S_{CTAB}$) by adsorption of cetyltrimethyl ammonium bromide (CTAB):

A silica wet cake was placed in a drier (120° C.) for drying, and thereafter the measurement was carried out in accordance with the method described in ASTM D3765-92. As the method described in ASTM D3765-92 was a method for measurement of $S_{CTAB}$ of carbon black, however, this testing method was somewhat improved. More precisely, without using ITRB (83.0 m²/g) which is a standard sample of carbon black, a standard liquid of CTAB was prepared separately. An assay of Aerosol OT solution was carried out by using the liquid, and a specific surface area of the silica was calculated from the adsorption amount of CTAB, assuming that the adsorption cross-sectional area per mole of CTAB to the surface area of the silica is 35 square Å. This is due to the reason that as the surface condition is different between carbon black and silica, the adsorption amount of CTAB is considered to be different between them even in case of the same specific surface area.

(3) Oil-absorption amount:

This value was obtained in accordance with JIS K6220.

(3) Amount of styrene unit in the copolymer:

This value was obtained in accordance with JIS K6383 (the refractive index method).

(4) The ratio of silica content:

Using a thermal analysis apparatus (model: TG/DTA320 manufactured by Seiko Electronic Industry), a residual ratio and a weight loss up to 150° C. after pyrolysis of a dried sample in the air were measured and the ratio of silica content was calculated according to the following equation. In Examples, the calculated value was converted into a ratio of an amount (parts by weight) to 100 parts by weight of the rubber. The measuring conditions were as follows: a temperature elevation velocity in the air of 20° C./min., a reached temperature of 600° C., and a retention time at 600° C. of 20 minutes.

The ratio of silica content (%)=a residual ratio/[100–(a weight loss up to 150° C.)]×100.

(5) Average particle diameter (D50) of silica-filled rubber, distribution index of article diameter (P) and weight ratio (W) of fine powder of not more than 200 μm:

Using a vibrating sieve-machine (manufactured by Tanaka Chemical Machinery Co.), six mesh sieves of a proper size (JIS Z8801) were equipped to the machine and 20 g of a sample was charged into the machine and vibrated for 5 minutes, and thereafter the weight of the sample on each sieve was measured. The particle diameter (D50) of the sample in case of the weight percentage of the sample retained on the sieves becoming 50% in term of weight, the ratio (W) % of the fine powder of 200 μm or less, and the weight ratio (P) of the dried granules within the range of D50± (D50×0.5) were then calculated. As the value of P becomes larger, the particle diameter is more uniform.

(7) Sphericity:

20 Typical particles were arbitrarily selected from a photographic image obtained by an optical microscope, the major axis ($D_L$) and the minor axis ($D_S$) of the particle images were measured by a scale. The sphericity is an average value of the ratio ($D_S/D_L$).

(8) 300% Modulus, tensile strength:

This value was measured by means of a tensile test in accordance with JIS K6301.

(9) Abrasion index:

Using an Acron type abrasion tester, the abrasion index was calculated from loss in weight after 1000 times preliminary abrasion and after 1000 times abrasion. As the abrasion index becomes larger, the abrasion property becomes better.

(10) Workability:

Degree of the generation of dust:

At the time of kneading the silica-filled rubber granules, especially at the time of feeding them to a Banbury mixer, degree of the generation of dust was evaluated according to the following classes:

⊚ No dust
○ Slightly generated
Δ Generated somewhat largly
× Generated seriously Fluidity:

Using a Powder Tester (Hosokawa Micron Co., LTD.), the degree of compression, the angle of repose, the angle of spatula and uniformity were measured, and the Carr's fluidity index was calculated from these values [A Japanese book entitled "Funtai Bussei Zusetsu" published on May 1 of Showa 50 (May 1, 1975) by Funtai kogaku Kenkyusho (Research Association of Powder Technology) and Nihon Funtai Kogyo Kyokai (Society of Powder Tecnology), pages 146~151]. As the value of the fluidity index becomes larger, the fluidity becomes better.

Time necessary to reach the maximum torque:

The silica-filed rubber was charged into a Banbury mixer and kneaded. A period of time from the initiation of kneading to the kneading torque becoming the maximum was measured. As the period of time becomes shorter, the kneaded mass is more easily packed into the mixer so that the silica becomes homogeneous in the rubber.

(11) Kneading energy:

Using a Banbury mixer (Laboplast Mill Model 100C, Mixer type B-250), A total energy needed for kneading was measured.

Example for Producing SBR Latex

In a pressure-resistant reactor equipped with a stirrer were placed 200 parts of deionized water, 1.5 parts of a rosin acid soap, 2.1 parts of fatty acid soap, 0.20 part of tert-dodecylmercaptan, and, as monomers, 72 parts of 1,3-butadiene and 28 parts of styrene. The temperature of the reactor was set at 10° C., and 0.03 part of diisopropylbenzene hydroperoxide as a polymerization initiator, 0.04 part of sodium formaldehyde sulfoxide, 0.01 part of sodium ethylenediaminetetraacetate, and 0.03 part of ferric sulfate were added to the reactor to initiate the polymerization. At the time the polymerization conversion rate reached to 45%, 0.05 part of tert-dodecylmercaptan was added to continue the reaction. At the time the polymerization conversion rate reached to 70%, 0.05 part of diethylhydroxylamine was added to terminate the reaction.

After removing unreacted monomers by steam distillation, a 30% aqueous emulsified solution of 0.8 parts of octadecyl-3-(3,5-di-tert-butyl-4-hydroxyphenyl)propionate and 0.12 parts of 2,4-bis(n-octylthiomethyl)-6-methylphenol was added as antioxidants per 100 parts of the polymer thereby to obtain a polymer latex (referred to hereinafter as SBR latex) having a solid concentration of 24%.

Next, a part of the latex was taken out and the latex was coagulated at 50° C. by addition of sodium chloride while adjusting the pH of the latex to 3~5 to obtain a polymer in the form of crumb. This crumb was dried in a hot blast drier at 80° C. to obtain a solid rubber (referred to hereinafter as solid SBR). The resultant rubber had a styrene proportion of 23.6% by weight and a Mooney viscosity of 52. The solid SBR thus obtained was used in the following Example 2.

Example 1 of Producing Silica

In a 1 m$^3$ stainless steel reactor equipped with a thermo-regulator was placed 230 liters of an aqueous solution of sodium silicate (SiO$_2$ concentration: 10 g/liter and the molar ratio: SiO$_2$/Na$_2$O=3.41) and the temperature of the solution was raised to 85° C. Next, 73 liters of 22% sulfuric acid and 440 liters of an aqueous solution of sodium silicate (SiO$_2$ concentration: 90 g/liter and the molar ratio: SiO$_2$/Na$_2$O=3.41) were concurrently added in 120 minutes. After aging for 10 minutes, 16 liters of 22% sulfuric acid was added in 15 minutes. The above reaction was carried out by stirring the reaction liquid at all times while maintaining the reaction temperature at 85° C. to obtain a silica slurry having a pH of 3.2 finally. The silica slurry was washed with water and filtered by a filter press to obtain a silica wet cake (A) having a silica solid of 23%.

A part of the resultant silica wet cake (A) was dried to obtain silica powders (a) having a BET specific surface area ($S_{BET}$) of 201 m$^2$/g, a CTAB specific surface area ($S_{CTAB}$) of 190 m$^2$/g, and an oil absorption amount of 210 ml/100 g.

The silica wet cake (A) obtained according to the above process and pure water were divided and mixed by a homogenizer so that a silica solid concentration of the aqueous suspension might be 15%. Next, a cationic polymer (polydiallylmethylammonium chloride having a weight average molecular weight: 20,000) was admixed in an amount such that 3 parts by weight was used for 100 parts of the silica solid concentration, thereby obtaining a cationic polymer-containing silica aqueous suspension (I). A silica particle diameter of the aqueous suspension (I) was 15 μm.

Example 2 of Producing Silica

In a 1 m$^3$ stainless steel reactor equipped with a thermo-regulator was placed 200 liters of an aqueous solution of sodium silicate (SiO$_2$ concentration: 10 g/liter and the molar ratio: SiO$_2$/Na$_2$O=3.41) and the temperature of the solution was raised to 95° C. Next, 77 liters of 22% sulfuric acid and 445 liters of an aqueous solution of sodium silicate (SiO$_2$ concentration: 90 g/liter and the molar ratio: SiO$_2$/Na$_2$O=3.41) were concurrently added in 140 minutes. After aging for 10 minutes, 16 liters of 22% sulfuric acid was added in 15 minutes. The above reaction was carried out by stirring the reaction liquid at all times while maintaining the reaction temperature at 95° C. to obtain a silica slurry having a pH of 3.2 finally. The silica slurry was washed with water and filtered by a filter press to obtain a silica wet cake (B) having a silica solid of 25%.

A part of the resultant silica wet cake (B) was dried to obtain silica powders (b) having a BET specific surface area ($S_{BET}$) of 201 m$^2$/g, a CTAB specific surface area ($S_{CTAB}$) of 110 m$^2$/g, and an oil absorption amount of 170 ml/100 g.

The silica wet cake (B) obtained according to the above process and pure water were divided and mixed by a homogenizer so that a silica solid concentration of the aqueous suspension might be 15%. Next, a cationic polymer (polydiallylmethylammonium chloride having a weight average molecular weight: 20,000) was admixed in an amount such that 3 parts by weight was used for 100 parts of the silica solid concentration, thereby obtaining a cationic polymer-containing aqueous silica suspension (I). A silica particle diameter of the aqueous suspension (II) was 15 μm.

Example 1 for Producing a Liquid Containing a Cocoagulation Product of Silica and Rubber 26.7 Kilograms of the aqueous silica suspension (I) was diluted with 90 kg of pure water and warmed up to 50° C. To the diluted aqueous silica suspension was then added 33.9 kg of the SBR latex under agitation to obtain a liquid (A) containing a cocoagulation product of silica and SBR. An average particle diameter of the cocoagulation product in the liquid (A) containing the cocoagulation product of silica and SBR was 100 μm. A part of the liquid (A) was filtered and dried to obtain the cocoagulation product having a silica content of 49 parts by weight.

Example 2 for Producing a Liquid Containing a Cocoagulation Product of Silica and Rubber 26.7 Kilograms of the aqueous silica suspension (II) was diluted with 90 kg of pure water and warmed up to 50° C. To the diluted aqueous silica suspension was then added 33.9 kg of the SBR latex under agitation to obtain a liquid (B) containing a cocoagulation product of silica and SBR. An average particle diameter of the cocoagulation product in the liquid (B) containing the cocoagulation product of silica and SBR was 800 μm. A part of the liquid (B) was filtered and dried to obtain the cocoagulation product having a silica content of 49 parts by weight.

Example 3 for Producing a Liquid Containing a Cocoagulation Product of Silica and Rubber 53.4 Kilograms of the aqueous silica suspension (1) was diluted with 90 Kg of pure water and warmed up to 50° C. To the diluted aqueous silica suspension was then added 33.9 kg of the SBR latex under agitation to obtain a liquid (C) containing a cocoagulation product of silica and SBR. An average particle diameter of the cocoagulation product in the liquid (C) containing the cocoagulation product of silica and SBR was 80 μm. A part of the liquid (A) was filtered and dried to obtain the cocoagulation product having a silica content of 98 parts by weight.

Example 1

The liquid (A) containing a cocoagulation product of silica and rubber was supplied to a filter press by the aid of a diaphragm pump and filtration was carried out under filtration pressure of 400 kPaG. Next, compression was carried out by using compressed air of 700 kPaG As a result, a water content of the cake was 51% by weight.

The cake was charged into a hopper equipped with a stirring type dividing machine to effect a primary dividing operation and a secondary dividing operation was then carried out by using a two-shafts screw type dividing machine equipped to the lower part of the hopper, while feeding the divided cake to a drier. At the time of the secondary dividing operation, the divided cake had predominantly a particle diameter of 1 mm or less.

The drier used was a lateral type internally stirring drier (A) as shown in Table 1, and the drying operation was carried out continuously. The performance of the lateral type internally stirring drier (A) and the drying condition are shown in Tables 1 and 2, respectively.

The temperature just after drying of the resultant silica-filled rubber granules was 114° C. and the water content thereof was 2.0% by weight. Table 4 shows D50, P, true spherical ratio, W and fluidity of the silica-filled rubber granules.

The silica-filled rubber granules thus obtained was incorporated with a silane coupling agent (KBE-846 manufactured by Shin-etsu Kagaku Kogyo), paraffin wax, stearic acid, zinc white, and an antioxidant (NOCRAC 6C manufactured by Ohuchi Sinko Kagaku Kogyo-sha), and kneaded for 2 minutes by the aid of a Banbury mixer (Laboplast Mill Model 100C Mixer type B-250 manufactured by Toyo Seiki).

Table 4 shows a result of workability at the time of kneading. The temperature on completion of the kneading was 150° C. Next, vulcanizing accelerator (NOCCELLER CZ manufactured by Ohuchi Sinko Kagaku Kogyo-sha) and sulfur were added and the whole was kneaded at 70° C. for one minutes by the aid of a Banbury mixer. A test piece was manufactured by press-vulcanizing at 160° C. for 15 minutes and measured for various physical properties.

By the way, the time for reaching the maximum torque, kneading energy, and measured values of physical properties were shown in term of index in case of Comparative Example 1 being 100. A result obtained is shown in Table 4.

Example 2

The liquid (C) containing a cocoagulation product of silica and rubber was supplied to a filter press by the aid of a diaphragm pump and filtration was carried out under filtration pressure of 400 kPaG. Next, compression was carried out by using compressed air of 700 kPaG. As a result, a water content of the cake was 60% by weight.

The dividing and drying operations were carried out in the same manner as described in Example 1. The resultant divided cake had predominantly a particle diameter of 1 mm or less. The temperature just after drying of the resultant silica-filled rubber granules was 105° C. and the water content thereof was 2.0% by weight. Table 4 shows D50, P, sphericity, W and fluidity of the silica-filled rubber granules.

The resultant silica-filled rubber granules was incorporated with various additives so as to have the proportion as shown in Table 3, and kneaded and vulcanized as in Example 1 to prepare a test piece. The physical properties of the test piece were measured, and the result of workability on kneading is shown in Table 4.

By the way, the time for reaching the maximum torque, kneading energy, and measured values of physical properties were shown in term of index in case of Comparative Example 1 being 100. A result obtained is shown in Table 4.

Example 3

The liquid (A) containing a cocoagulation product of silica and rubber was supplied to a filter press by the aid of a diaphragm pump and filtration was carried out under filtration pressure of 100 kPaG. Next, compression was carried out by using compressed air of 250 kPaG. As a result, a water content of the cake was 72.5% by weight.

The cake was easily capable of being divided and supplied continuously to the drier only by the aid of a two-shafts screw type dividing machine.

The drier comprised of a lateral type internally stirring drier (B) arranged serially after a laterally type internally stirring drier (A) and the drying operation was carried out continuously. The performance o the lateral type internally stirring drier (B) and the drying condition are shown in Tables 1 and 2, respectively.

The temperature just after drying of the resulting silica-filled rubber granules was 118° C. and the moisture content thereof was 0.9% by weight. Table 4 shows D50, P. sphericity, W and fluidity of the silica-filled rubber granules.

The resultant silica-filled rubber granules was incorporated with various additives so as to have the proportion as shown in Table 3, and kneaded and vulcanized as in Example 1 to prepare a test piece. The physical properties of the test piece were measured, and the result of workability on kneading is shown in Table 4.

By the way, the time for reaching the maximum torque, kneading energy, and measured values of physical properties were shown in term of index in case of Comparative Example 1 being 100. A result obtained is shown in Table 4.

Example 4

Using the cake employed in Example 3 having a water content of 72.5% by weight and a two-shafts screw type dividing machine alone, the cake was continuously supplied to the drier.

The drier used was a lateral type internally stirring drier (A) as shown in Table 1, and the drying operation was carried out continuously in the same manner as described in Example 1 except that the drying condition was as shown in Table 2.

The temperature just after drying of the resultant silica-filled rubber granules was 106° C. and the water content thereof was 1.5% by weight. Table 4 shows D50, P, sphericity, W and fluidity of the silica-filled rubber granules.

The resultant silica-filled rubber granules was incorporated with various additives so as to have the proportion as shown in Table 3, and kneaded and vulcanized as in Example 1 to prepare a test piece. The physical properties of the test piece were measured, and the result of workability on kneading is shown in Table 4.

By the way, the time for reaching the maximum torque, kneading energy, and measured values of physical properties were shown in term of index in case of Comparative Example 1 being 100. A result obtained is shown in Table 4.

Example 5

The liquid (B) containing a cocoagulation product of silica and rubber was supplied to a filter press by the aid of a diaphragm pump and filtration was carried out under filtration pressure of 400 kPaG. Next, compression was carried out by using compressed air of 700 kPaG As a result, a water content of the cake was 45% by weight. The dividing and drying operation was carried out in the same manner as in Example 1. The divided cake had predominantly a particle diameter of 1 mm or less.

The temperature just after drying of the resultant silica-filled rubber granules was 120° C. and the water content thereof was 1.0% by weight. Table 4 shows D50, P, sphericity, W and fluidity of the silica-filled rubber granules.

The resultant silica-filled rubber granules was incorporated with various additives so as to have the proportion as shown in Table 3, and kneaded and vulcanized as in Example 1 to prepare a test piece. The physical properties of the test piece were measured, and the result of workability on kneading is shown in Table 4.

By the way, the time for reaching the maximum torque, kneading energy, and measured values of physical properties were shown in term of index in case of Comparative Example 1 being 100. A result of the measurement is shown in Table 4.

Comparative Example 1

The cake obtained in Example 1 having a water content of 51% by weight was dried at 110° C. in a box type hot-blast circulating drier to obtain a lumpy silica-filled rubber. A water content of the resultant silica-filled rubber was 0.9%, and W was 2% by weight.

After crushing the resultant lumpy mass of silica-filled rubber so that the diameter thereof might become about 5 cm, the silica-filled rubber was incorporated with various additives so as to have the proportion as shown in Table 3, the kneaded and vulcanized as in Example 1 to prepare a test piece. The physical properties of the test piece were measured, and the result of workability on kneading is shown in Table 4.

By the way, time for reaching the maximum torque, kneading energy, and measured values of physical properties were shown in term of index in case of Comparative Example 1 being 100.

Comparative Example 2 (Fluidized Bed)

The cake obtained in Example 1 having a water content of 51% by weight was charged into a hopper equipped with a stirring type dividing machine to perform the primary dividing operation and the secondary dividing operation was then carried out by using the two-shafts screw type dividing machine equipped to the lower part of the hopper, while feeding the divided cake continuously to a drier. The divided cake at the time of the secondary dividing operation had predominantly a particle diameter of 1 mm or less.

A continuous type fluidized bed drier was used as the drier, and a continuous drying operation was carried out by setting the amount of supplying the divided cake so as to enable the drying under such condition that the inlet gas temperature was 150° C., the outlet gas temperature was 60° C., and the residential time was 30 minutes. The resultant granular silica-filled rubber just after drying had a temperature of 102° C., and a water content of 2.0% by weight. In the fluidized bed, there was seen such divided cake mutually bound again. Table 4 shows D50, P, sphericity, W and fluidity of the silica-filled rubber powder (A).

The silica-filled rubber granules thus obtained was incorporated with a silane coupling agent (KBE-846 manufactured by Shin-etsu Kagaku Kogyo), paraffin wax, stearic acid, zinc white, and an antioxidant (NOCRAC 6C manufactured by Ohuchi Sinko Kagaku Kogyo-sha), and kneaded for 2 minutes by the aid of a Banbury mixer (Laboplast Mill Model 100C Mixer type B-250 manufactured by Toyo Seiki).

Table 3 shows presence or absence of the generation of powder dust and the result of workability. The temperature of the silica-filled rubber granules just after kneading was 150° C. Next, vulcanizing accelerator (NOCCELER CZ manufactured by Ohuchi Sinko Kagaku Kogyo-sha) and sulfur were added and the whole was kneaded at 70° C. for one minutes by the aid of a Banbury mixer. A test piece was manufactured by press-vulcanizing at 160° C. for 15 minutes and measured for various physical properties.

By the way, the time for reaching the maximum torque, kneading energy, and measured values of physical properties were shown in term of index in case of Comparative Example 1 being 100. A result obtained is shown in Table 5.

Comparative Example 3 (Fluidized Bed)

The cake used in Example 3 having a water content of 72.5% by weight was used and a dividing operation was carried out only by the aid of the two-shafts screw type dividing machine. As in the case of Comparative Example 2, a fluidized bed drying was carried out in trial. As the water content of the cake was too excessive, however, the cake was bound to the bottom plate of the fluidized bed so that the drying operation could not well be carried out.

INDUSTRIAL APPLICABILITY

The novel silica-filled rubber obtained according to the present invention has such a character that it is extremely less powdery and is hardly charged electrostatically. In addition, it is excellent in handling and kneading and so has a great possibility of effectively utilizing as a reinforcing filler for rubber.

TABLE 1

|  | Unit | Drier A | Drier B |
|---|---|---|---|
| Full length | mm | 3000 | 1600 |
| Internal diameter of drum | mm | 150 | 400 |
| Number of stirring shafts | number | 1 | 1 |
| Shape of stirring wing blades | — | Plate inclined wing | Disk wing |
| Clearance between wall and wing blades | mm | 10 | 4 |
| Supply of heating medium | — | Jacket | Jacket, shaft and blades |
| Sort of heating medium | — | Steam | Steam |

TABLE 2

|  |  | Examples 1, 2, 5 | Example 3 | Example 4 |
|---|---|---|---|---|
| Drier | Unit | Drier A | Drier A | Drier B | Drier A |
| Residential time of materials to be dried | Minutes | 4 | 4 | 20 | 6 |
| Circumferential velocity of stirring wing blades | m/s | 4 | 4 | 0.53 | 3 |
| Temperature of jacket | ° C. | 160 | 160 | 130 | 160 |
| Dew-preventing gas | — | Air | Air | Air | Nitrogen |
| Temperature of dew-preventing gas | ° C. | 160 | 160 | 130 | 160 |
| Operation pressure | kPaG | Normal pressure | Normal pressure | Normal pressure | Normal pressure |

TABLE 3

|  | Unit | Examples 1, 3, 4 and 5 | Example 2 | Comparative Example 1 | Comparative Example 2 |
|---|---|---|---|---|---|
| Silica-filled rubber granules | phr | 150 | 100 | — | — |
| Solid SBR | phr | — | 50 | — | — |
| Silica-filled rubber lump | phr | — | — | 150 | — |
| Silica-filled rubber powder | phr | — | — | — | 150 |
| Silane coupling agent | phr | 4 | 4 | 4 | 4 |
| Paraffin wax | phr | 1 | 1 | 1 | 1 |
| Stearic acid | phr | 2 | 2 | 2 | 2 |
| Zinc white | phr | 4 | 4 | 4 | 4 |
| Antioxidant | phr | 1 | 1 | 1 | 1 |
| Vulcanizing accelerator | phr | 1.5 | 1.5 | 1.5 | 1.5 |
| Sulfur | phr | 2 | 2 | 2 | 2 |

TABLE 4

|  |  | Example 1 | Example 2 | Example 3 | Example 4 | Example 5 |
|---|---|---|---|---|---|---|
|  | D50 (μm) | 800 | 700 | 1600 | 1400 | 800 |
|  | P (% by weight) | 55 | 74 | 85 | 84 | 53 |
|  | Sphericity | 0.74 | 0.75 | 0.84 | 0.85 | 0.68 |
|  | W (% by weight) | 10 | 7 | 3 | 2 | 10 |
| Workability | Generation of dust | ◎ | ◎ | ◎ | ◎ | ◎ |
|  | Fluidity | 96 | 97 | 98 | 99 | 96 |
|  | Time necessary to reach the maximum torque | 80 | 82 | 80 | 79 | 80 |
|  | Kneading energy | 85 | 88 | 86 | 89 | 82 |
| Physical properties of rubber | 300% modulus | 100 | 98 | 101 | 101 | 105 |
|  | Tensile strength | 98 | 97 | 97 | 98 | 95 |
|  | Abrasion index | 102 | 97 | 100 | 101 | 95 |

TABLE 5

|  |  | Comparative Example 1 | Comparative Example 2 |
|---|---|---|---|
|  | D50 (μm) | — | 180 |
|  | P (% by weight) | — | 28 |
|  | Sphericity | — | 0.61 |
|  | W (% by weight) | 2 | 70 |
| Workability | Generation of dust | ◎ | Δ |
|  | Fluidity | — | 78 |
|  | Time necessary to reach the maximum torque | 100 | 90 |
|  | Kneading energy | 100 | 90 |
| Physical properties of rubber | 300% Modulus | 100 | 101 |
|  | Tensile strength | 100 | 96 |
|  | Abrasion index | 100 | 99 |

The invention claimed is:

1. Silica-filled rubber granules wherein the granules are comprised of dried granules of a cocoagulation product of rubber and silica having an average particle diameter (D50) of 300-3000 μm and a weight ratio of the granules within the range of D50±(D50×0.5) is at least 50% by weight, and wherein the granules have a sphericity of 0.68-0.85 determined by a ratio of the major axis ($D_L$) and the minor axis ($D_S$) of the granules ($D_L/D_S$).

2. Silica-filled rubber granules according to claim 1, wherein a weight ratio of the granules within the range of D50±(D50×0.5) is at least 80% by weight.

3. Cross-linked rubber obtained by cross-linking the silica-filled rubber granules according to claim 1 or 2.

* * * * *